No. 798,168. PATENTED AUG. 29, 1905.
F. CONRAD.
SPRING ABUTMENT FOR MEASURING INSTRUMENTS.
APPLICATION FILED SEPT. 22, 1904.
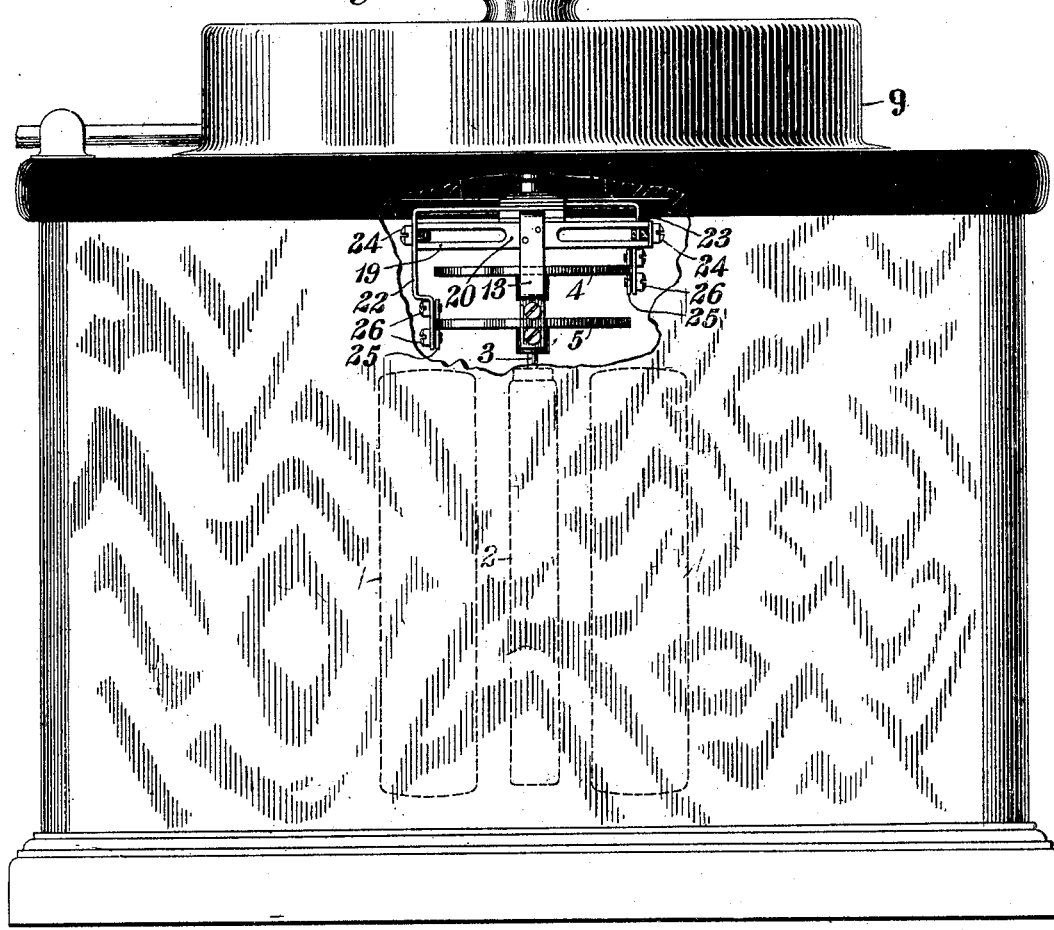
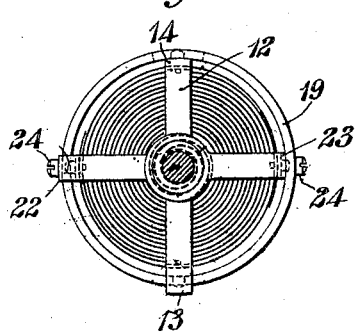
WITNESSES:
C. L. Belcher
Otto S. Schairer
INVENTOR
Frank Conrad
BY
Wesley G. Carr
ATTORNEY

UNITED STATES PATENT OFFICE.

FRANK CONRAD, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SPRING-ABUTMENT FOR MEASURING INSTRUMENTS.

No. 798,168.     Specification of Letters Patent.     Patented Aug. 29, 1905.

Application filed September 22, 1904. Serial No. 225,500.

*To all whom it may concern:*

Be it known that I, FRANK CONRAD, a citizen of the United States, and a resident of Edgewood Park, in the county of Allegheny and State of Pennsylvania, have invented a new and useful Improvement in Spring-Abutments for Measuring Instruments, of which the following is a specification.

My invention relates to instruments of precision, and particularly to means for adjusting the springs of such instruments for purposes of calibration.

The object of my invention is to provide instruments of precision having spiral springs, the deflection of which determines the amount of energy or force to be measured, with abutments which may be so adjusted that the indications shall be accurate throughout the range of movement of the member which causes deflection of the springs.

In the calibration and first adjustment of an instrument having springs for connecting the shaft which supports the movable member with an arbor considerable difficulty is often experienced in securing accuracy of indication throughout the length of the scale. Ordinarily the instrument is first adjusted for zero position and then the energy or power corresponding to the full capacity of the instrument is applied to the springs and the springs are then adjusted so that the indicating-pointer coincides with the last scale-division. In making this adjustment the active lengths of the springs are changed, and consequently the pointer will not coincide with the zero scale position when the power or energy is removed from the springs. A new adjustment is therefore necessary, and this must be repeated for the zero and final scale-divisions until the indication is accurate for both ends of the scale. My invention provides means whereby the springs may be quickly and accurately adjusted, so as to secure the desired uniformity of indication throughout the length of the scale.

In the accompanying drawings, Figure 1 is a view in side elevation of an electrical measuring instrument embodying my invention, a portion of the casing of the instrument being broken away. Fig. 2 is a sectional view of that portion of the instrument to which my invention directly pertains. Fig. 3 is a plan view of the parts shown in Fig. 2, and Fig. 4 is a plan view of one of the spiral springs of the instrument.

As my invention is primarily intended for use in connection with electrical measuring instruments, I have so illustrated it and have indicated, in broken lines in Fig. 1, stationary members comprising coils 1 and a movable member comprising one or more coils 2, the reaction between which when currents are supplied thereto effects rotative movement of a shaft or spindle 3. To the upper end of the spindle 3 are fastened the inner ends of two oppositely-coiled spiral springs 4 and 5 by means of collars 6 and 7 and set-screws 8.

Mounted in suitable bearings in the frame 9 of the instrument is an arbor 10, the upper end of which is provided with a milled head or knob 11, by means of which the arbor may be turned readily in either direction. Clamped to the lower end of the arbor 10 by suitable clamping devices is a metal strip 12, the ends of which are bent downward, substantially at right angles to the body portion, one of the ends 13 being materially longer than the other end 14 in order that the two may correspond in length to the positions of the two spiral springs 5 and 4. The part 14 constitutes the end abutment for the spring 4, the end of the spring being clamped between this part and a strip 15 by means of screws 16. In the same manner the part 13 constitutes the abutment for the spring 5, the end of the spring being clamped between the said part and a strip 17 by means of screws 18.

Suitably riveted or otherwise fastened to the parts 13 and 14 near the body portion 12 is a ring 19, the body of which is so cut away as to constitute, in effect, two rings, except for a short distance at diametrically opposite points where solid portions 20 are left for the purpose of riveting the same to the parts 13 and 14.

A portion 21 of the outer turn of each of the springs 4 and 5 is bent in the form of a portion of the circumference of a circle, so as to be accurately concentric with the spindle 3, and in order to utilize this portion of each of the springs to effect ready and accurate adjustment I provide auxiliary abutments 22 and 23, the inner ends of which are mounted upon the arbor 10 above and adjacent to the part 12 and the parts of which that are bent at right angles to the body portion are fastened to the ring 19 by means of screws 24, the abutments being thereby securely supported in position. The free ends of the abutments 22 and 23 may be respectively fastened to the springs 5 and 4 by strips 25 and screws 26, substantially like those employed in connection with the abutments 13 and 14.

In calibrating the instrument the springs are first adjusted by means of the abutments 13 and 14, so that the indicating-pointer of the instrument shall stand in its proper zero position and the instrument is then loaded to its full capacity. If it is found that the pointer does not coincide with the final division of the scale when the instrument is so loaded, the abutments 22 and 23, or either of them, may be moved a sufficient distance along the concentric portion 21 of the corresponding spring or springs to effect the proper adjustment, such adjustment being readily secured by reason of the fact that when the active portion of the spring is shortened the spring as a whole is stiffened.

As hereinbefore suggested, my invention will probably be generally found especially useful in electrical measuring instruments; but it is not intended to limit the invention to such instruments, nor is it my intention to otherwise impose either structural or functional limitations except in so far as the prior art may render necessary.

I claim as my invention—

1. In a measuring instrument, the combination with a shaft, of spiral springs each of which has one end connected thereto, an adjustable abutment to which the outer ends of both springs are attached, and independent abutments that are adjustable along the outer turns of the respective springs.

2. In a measuring instrument, the combination with a shaft, of oppositely-coiled spiral springs each of which has one end secured thereto, an adjustable abutment to which the other ends of the springs are detachably secured, and independent abutments that are adjustable along the outer turns of said springs.

3. In a measuring instrument, the combination with a shaft, of spiral springs having their inner ends secured thereto, an adjustable abutment to which the outer ends of the springs are secured, and independently-adjustable abutments secured to the outer turns of said springs.

4. In a measuring instrument, the combination with a shaft, of oppositely-coiled spiral springs having their inner ends secured thereto, an adjustable abutment to which the outer ends of the springs are secured, and independently-adjustable abutments secured to the outer turns of said springs.

5. In a measuring instrument, the combination with a shaft, of spiral springs having their inner ends secured thereto, an abutment to which the outer ends of the springs are adjustably secured, and independently-adjustable abutments secured to the outer turns of said spiral springs.

6. In a measuring instrument, the combination with a shaft, of spiral springs having their inner ends secured thereto, portions of the outer turns of said springs being concentric with said shaft, and independently-adjustable abutments secured to said concentric portions and adjustable along the same.

7. In a measuring instrument, the combination with a rotatable member, and a shaft therefor, of spiral springs having their inner ends secured to said shaft, portions of the outer turns of said springs being concentric with said shaft, an adjustable abutment to which the outer ends of the springs are attached, and independently-adjustable abutments secured to the said concentric portions of the springs.

8. In a measuring instrument, the combination with a rotatable member, and a shaft therefor, of oppositely-coiled spiral springs having their inner ends secured to said shaft, portions of the outer turns of said springs being concentric with said shaft, an adjustable abutment to which the outer ends of the springs are attached, and independently-adjustable abutments secured to the said concentric portions of the springs.

9. In a measuring instrument, the combination with a shaft and a rotatable member carried thereby, of means for adjusting the position of the rotatable member comprising an adjustable abutment, spiral springs having their outer ends attached thereto and having their inner ends attached to the said shaft, and abutments adjustable independently of each other which are respectively secured to said springs near the outer ends thereof.

10. In a measuring instrument, the combination with a rotatable member, and a shaft therefor, of oppositely-coiled spiral springs having their inner ends secured to said shaft, an adjustable abutment to which the outer ends of the springs are attached, and other abutments which are adjustable independently of each other and are secured to the respective springs near the outer ends thereof.

In testimony whereof I have hereunto subscribed my name this 11th day of August, 1904.

FRANK CONRAD.

Witnesses:
A. W. COPLEY,
BIRNEY HINES.